United States Patent
Leshniak et al.

(10) Patent No.: US 8,829,806 B2
(45) Date of Patent: *Sep. 9, 2014

(54) VARIABLE OUTPUT MODULE AND METHOD FOR ELECTRICAL SIGNAL OUTPUT

(75) Inventors: Itai Leshniak, Fair Lawn, NJ (US); John Koteles, Las Vegas, NV (US)

(73) Assignee: Magtech Industries Corporation, Las Vegas, NV (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/556,038

(22) Filed: Jul. 23, 2012

(65) Prior Publication Data

US 2012/0299506 A1 Nov. 29, 2012

Related U.S. Application Data

(63) Continuation-in-part of application No. 13/227,877, filed on Sep. 8, 2011, now Pat. No. 8,227,996, which is a continuation of application No. 12/386,123, filed on Apr. 13, 2009, now Pat. No. 8,018,172.

(51) Int. Cl.
*H05B 37/02* (2006.01)
*H05B 33/08* (2006.01)

(52) U.S. Cl.
CPC .......... *H05B 33/0815* (2013.01); *Y02B 20/346* (2013.01)
USPC ............................ 315/291; 315/224; 315/246

(58) Field of Classification Search
USPC ............. 315/294, 295, 246, 247, 209 R, 224, 315/225, 194, 195, DIG. 4, 291
See application file for complete search history.

(56) References Cited

U.S. PATENT DOCUMENTS

| 6,534,928 B1 * | 3/2003 | Li et al. .......................... 315/246 |
| 8,018,172 B2 * | 9/2011 | Leshniak ....................... 315/194 |
| 8,227,996 B2 * | 7/2012 | Leshniak ....................... 315/246 |

\* cited by examiner

*Primary Examiner* — David H Vu
(74) *Attorney, Agent, or Firm* — Lightbulb IP, LLC

(57) ABSTRACT

A variable output module provides accurate full range dimming or adjustment of power output. The variable output module utilizes the characteristics of an AC or other periodic signal rather than its power output to accurately determine the level of dimming a user desires. In this manner, the variable output module provides accurate full range dimming without the need for calibration to specific AC signals. The variable output module can detect the period of an AC signal allowing the driver to be used with various frequencies without the need for calibration. In one or more embodiments, the driver compares the pulse widths of a dimmed AC signal to the period of the AC signal to determine the desired level of dimming.

20 Claims, 5 Drawing Sheets

VARIABLE OUTPUT MODULE AND METHOD FOR ELECTRICAL SIGNAL OUTPUT

CROSS-REFERENCE TO RELATED APPLICATION

This application is a continuation-in-part of U.S. patent application Ser. No. 13/227,877, filed Sep. 8, 2011, now U.S. Pat. No. 8,227,996, which is a continuation of U.S. patent application No. 12/386,123, filed Apr. 13, 2009, now U.S. Pat. No. 8,018,172.

BACKGROUND OF THE INVENTION

1. Field of the Invention

The invention relates generally to power supplies and drivers and in particular to a variable output module for generating electrical output or signals based on periodic signal characteristics of an input signal.

2. Related Art

Phase dimmers are commonly used to dim incandescent lights in residential and commercial applications. Such dimmers generally operate by chopping the sine wave of an AC signal thereby reducing the energy output to dim one or more lights. While this allows an incandescent bulb to be dimmed, a phase dimmer's output is not well suited for LED lighting.

The phase dimmer's output must generally be converted into a signal that can drive an LED light source. One method has been to convert the dimmed power output of a phase dimmer into a corresponding signal for an LED light source. Traditionally, this conversion has resulted in workable dimming of LED lighting via a phase dimmer. However, the conversion results in dimming of lesser quality than that of incandescent lighting. For example, a phase dimmer can not smoothly dim an LED light source from high or maximum brightness down to low or no brightness.

LED lighting is increasingly popular and highly desirable due to its high efficiency light output. LED lighting may also be more compact and have a longer life than incandescent or other types of lighting. Unfortunately, traditional dimming systems do not allow LEDs to be dimmed in the way incandescent or other lighting technologies can be. This prevents LEDs from being considered for use or used where dimming is desired.

From the discussion that follows, it will become apparent that the present invention addresses the deficiencies associated with the prior art while providing numerous additional advantages and benefits not contemplated or possible with prior art constructions.

SUMMARY OF THE INVENTION

A variable output module for measuring and controlling electrical output is disclosed herein. The variable output module is configured to accurately determine a desired level of electrical output from an input signal during and after the input signal has been dimmed or adjusted to indicate another desired level of electrical output.

The variable output module may have a variety of configurations. For example, in one embodiment a variable output module for controlling electrical output may be provided. Such a variable output module may comprise one or more input terminals configured to receive an electrical signal, and a controller in electrical communication with the input. The controller may be configured to receive the electrical signal, determine a pulse width of the electrical signal, determine the period of the electrical signal, and generate a varying level of electrical output. The electrical output is generally increased or decreased based on a ratio of the pulse width of the electrical signal to the period of the electrical signal. In this manner, the electrical output may be an output signal indicating the ratio of the pulse width to the period of the electrical signal.

One or more output terminals may be configured to transmit the electrical output from the direct current driver. The electrical output may be a direct current output. The input terminals may be configured to receive a modulated electrical signal.

It is noted that the variable output module may include a dimmer configured to receive and alter a duty cycle of the electrical signal before the electrical signal reaches the controller. The dimmer may include at least one control, such as a knob, configured to receive user input indicative of a power level a user desires.

The variable output module may also include an amplifier configured to amplify the electrical output. The amplified electrical output may then be transmitted from the variable output module via the output terminals. A converter may be provided to convert the electrical output to a pulse width modulation signal, which may be transmitted from the variable output module via the output terminals.

In another exemplary embodiment, a variable output module providing direct current output may be provided. Such a variable output module may comprise a controller and a driver. The controller may have a first input and a first output and be configured to receive the electrical signal at the first input, determine a pulse width of the electrical signal, determine the period of the electrical signal, generate a control signal that varies according to a ratio of the pulse width of the electrical signal to the period of the electrical signal, and transmit the control signal from the first output.

The driver may have a second input and a second output and be configured to receive the control signal from the controller at the second input, generate a direct current power output based on the control signal, and transmit the direct current power output to an external device from the second output.

It is noted that the driver may be further configured to alter the power level by changing the voltage of the direct current power output as the control signal changes. In addition or alternatively, the driver may be further configured to alter the power level by changing the current of the direct current power output as the control signal changes.

The first input may be configured to receive a modulated electrical signal. The first input may also or alternatively be connected to a dimmer. An enclosure may be configured to house the controller and the driver in a single self-contained assembly.

Various methods of providing a desired level of power output are disclosed herein as well. For instance, in one exemplary embodiment, a method of providing a desired power level from an electrical signal with a variable output module is provided. Such a method may comprise receiving an electrical signal having a periodicity at an input terminal of the direct current module, determining a pulse width of the electrical signal with a controller of the direct current module, and determining a period of the electrical signal with the controller.

This exemplary method also includes generating a first signal if a ratio of the pulse width to the period is above a predefined threshold, generating a second signal if the ratio of the pulse width to the period is below the predefined threshold, and outputting the first or the second signal through an output terminal. The pulse width and period may be determined by the controller based on a time at which the electrical signal crosses a predefined voltage threshold.

It is noted that the first and second signal may both be direct current signals. The input terminal may be connected to an electrical signal source such that the electrical signal is received from the electrical signal source. Alternatively, the input terminal may be connected to a dimmer such that the electrical signal is received from the dimmer. The output terminal may be connected to a driver that is configured to generate a power output of a first level if the first signal is received, and a power output of a second level if the second signal is received (where the first and second levels are distinct).

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
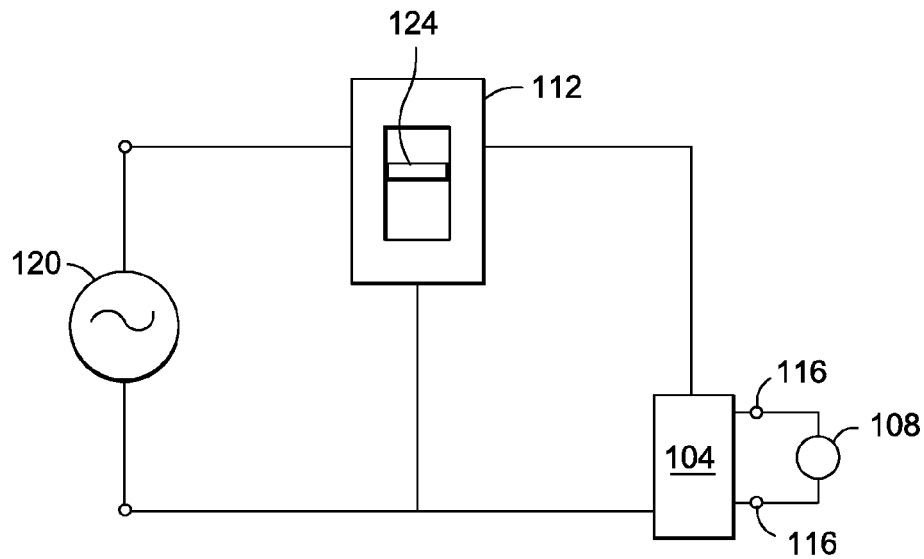
FIG. 1 is a block diagram illustrating an exemplary wiring diagram for an exemplary variable output module.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

LED lighting, such as one or more LED based bulbs or one or more individual LEDs themselves, typically requires an adapter or driver which converts a 115V, 230V, 277V, or other AC power source to a DC source which is usable to properly power an LED. This is because LEDs are not typically designed to operate with AC power directly. Typically, a driver also provides a level of current and voltage within the operating parameters of an LED to ensure proper operation of the LED. For example, a driver may accept an AC power input and provide a relatively low voltage DC output to power an LED.

The variable output module herein is generally configured to accept an AC input signal or AC power and to provide an output for powering LED lighting. Though the LED lighting is generally discussed herein in terms of one or more LEDs, it will be understood that the variable output module may be used with a variety of light emitting devices that utilize one or more LEDs for their light source. For example, individual LEDs or LED based light bulbs may be powered by the variable output module.

The variable output module allows full range (0% to 100% light output) dimming for LED lights. The variable output module also allows a desired level of light to be accurately provided by LED lighting. The desired level of light or light output as used herein refers to the level of light a user desires for a room, building, or other interior or exterior space. In general, a user indicates his or her desired level of light by interacting with a lighting control, such as a dimmer as will be discussed below.

In general, the variable output module utilizes the timing or phase of an AC input signal to determine a user's desired level of light output. This is highly advantageous in that utilizing the timing of an AC input allows the desired level of light output to be accurately determined.

In contrast, traditional LED drivers utilize the power level of an AC power source to determine the desired level of light output. In general, this works by measuring the difference between the actual AC output and the normal or reference output of an AC power source to determine the light level that is desired. For example, an AC output of half an AC power source's reference or normal output would indicate that half of the maximum light level should be provided. A traditional LED driver would then adjust its output accordingly to provide half the maximum light output from a LED.

In practice however, the use of power level to determine the amount of dimming is difficult or impossible to properly implement. This is because it is difficult, if not impossible, to accurately establish a reference power output for an AC power source. As is known, AC power supply will change as a function of voltage depending on the AC power source. For instance, in North America a standard wall outlet may provide 110-120V at 60 Hz while other voltage and frequency standards are utilized elsewhere.

AC power sources (including those providing power according to a standard) rarely produce a constant output. For example, in North America, utility companies may change supply voltages by up to 10%. Thus, a residential outlet may ideally output 115V, but its output may somewhat abruptly change from anywhere between 110V and 120V. Further, turning on or off electrical devices can cause fluctuations in power levels. For example, AC power output often fluctuates when appliances, air conditioning units, or other high power draw devices are activated. While traditional LED drivers may be calibrated or set to expect reference power outputs according to AC power standards, this calibration cannot compensate for these real time changes to power output.

Without an accurate or reliable reference power output, the determination of desired light level by a traditional LED driver is inaccurate. This is because the comparison of actual power output to an inaccurate reference power output skews the determination of the desired light level. For example, if the expected reference power output is set lower than the actual reference power level of an AC power source, the LED driver may provide light output higher than what is desired. Where the expected reference power output is set higher than the actual reference power level, the LED driver may provide light output lower than what is desired.

Some manufacturers have attempted to compensate for the known inaccuracy of the reference power output by reducing dimming range. For example, a LED driver may be configured such that AC power output below a certain threshold turns off a light while AC power output above a certain threshold results in maximum brightness. In this manner light output may be dimmed/increased between the thresholds. However, this is a limited range and often results in the light abruptly turning off as AC power output is lowered, and the light abruptly jumping to maximum output as AC power output is increased. In some installations, traditional LED drivers cause LED lighting to remain on even when a user desires no light, or cause LED lighting to jump to a maximum level when a moderate level of light is desired, as light levels are adjusted.

These abrupt changes in light level and reduced dimming range are undesirable especially when LED dimming is compared to that of incandescent or other lighting technologies. In many applications, the inability to smoothly dim LED lighting may overwhelm its benefits, including durability, efficiency, and reliability, leading users to select older lighting technologies. In contrast, the variable output module herein provides full range dimming from 100% to 0% light output without abrupt changes in light level unless desired by the user.

The variable output module will now be described with regard to the figures. FIG. 1 is a block diagram illustrating an LED driver 104 having a variable output module. The LED driver 104 is connected to a phase dimmer 112, and an AC power source 120. The LED driver 104 may have one or more outputs 116 which are used to power a LED bulb 108 or other LED lighting. It is noted that, though shown with a single LED bulb 108, an LED driver 104 may drive a plurality of LED bulbs 108 or other LED lighting.

The block diagram of FIG. 1 illustrates a standard or typical wiring setup for a phase dimmer 112 and AC power source 120. For this reason, the wiring configuration may be found in the vast majority of phase dimmer 112 installations. Accordingly, it can be seen that the LED driver 104 may be used to retrofit existing wiring for fully dimmable LED lighting. In addition, it can be seen that the LED driver 104 does not require special wiring setups in order to provide full range LED dimming. This is highly advantageous because the power efficiency, reliability, and durability benefits of LED lighting can be conveniently provided with full range dimming.

As will be described further below, the LED driver 104 may accept an AC signal from an AC power source 120 which may be altered by a dimmer 112. For example, as shown, the AC signal from the AC power source 120 passes through the dimmer 112 before reaching the LED driver 104. The dimmer 112 may alter the duty cycle of the AC signal to control the power provided by the AC signal. Traditionally, this alteration in the duty cycle allows the voltage of an AC signal to be controlled which allows light output from incandescent lighting to be controlled. In contrast, with the LED driver 104 herein, the changes or alterations to the AC signal caused by the dimmer may be detected by its variable output module to determine and ultimately provide a corresponding level of light output through an LED bulb 108, as will be described further below.

It is noted that the changes in the AC signal may be used to determine desired characteristics of light output in addition to or instead of the level of light output. For example, alterations to the duty cycle of an AC signal may be used to determine the desired color temperature or color of light output. For example, rather than dimming one or more LEDs, the LED driver herein may change the color temperature or color of light output based on the detected alterations to an AC signal. Of course, in one or more embodiments, the LED driver may be configured to control the level of light output, color temperature, or a combination thereof based on alterations to the AC signal.

Generally, a dimmer 112 allows a user to alter the output signal of an AC power source by adjusting a control 124. In the embodiment shown, for example, a sliding control may be moved linearly to increase or decrease the output signal's power level. Of course, other types of controls may be used. For example, the dimmer 112 may have a rotary knob that can be rotated to control the output of an AC power source. Generally, moving the control in one direction increases power output while moving in the opposite direction decreases power output.

Figure 2A:
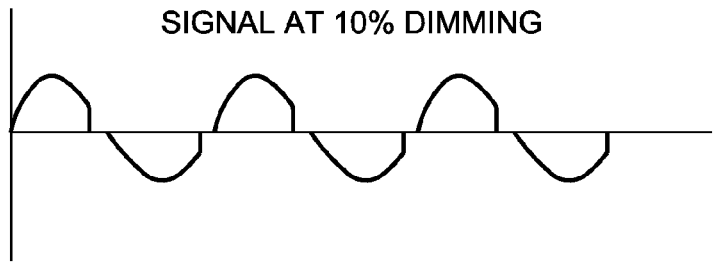
FIG. 2A illustrates an exemplary AC signal at a low level of dimming.
Figure 2B:
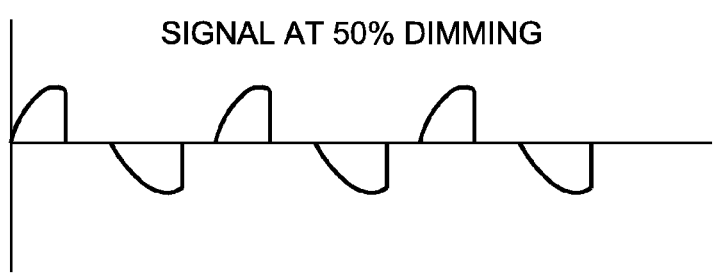
FIG. 2B illustrates an exemplary AC signal at a moderate level of dimming.
Figure 2C:
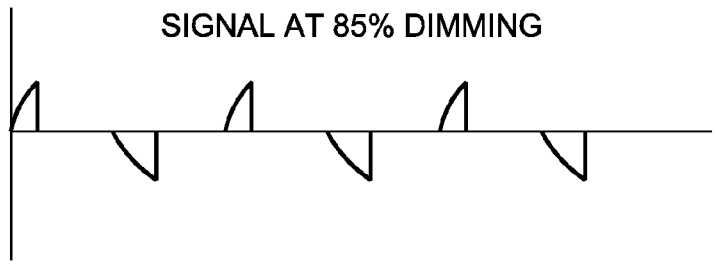
FIG. 2C illustrates an exemplary AC signal at a high level of dimming.

In one or more embodiments, the dimmer 112 may be a phase dimmer. A phase dimmer 112 generally operates by altering the duty cycle of an AC signal to control the power level of the AC signal. For example, portions of the voltage of an AC signal may be chopped, such as by zeroing out the voltage or setting the voltage to another low level. To illustrate, FIGS. 2A-2C show the sine wave of an AC signal that has been altered by chopping portions of the signal. As can be seen, instead of a smooth sine wave, the altered signals have zero or other low voltage portions.

As illustrated the sine waves have been chopped at their trailing edges. In some dimmers, signal chopping may occur on the leading edges of a sine wave. For example, a dimmer utilizing a triac may chop the leading edges of an AC signal rather than the trailing edges. It will be understood that the variable output module herein may determine a desired level of light and thus dim one or more LEDs regardless of whether an AC signal has been chopped at its leading or trailing edges.

Typically, an AC signal will be chopped at substantially the same place or places within each period of the wave for a particular level of dimming. This is shown in FIGS. 2A-2C where similar or the same portions of the AC signal have been chopped. As the dimmer 112 is dimmed, such as by moving its control 124, increasing portions of the sine wave are chopped. For example, as shown in FIG. 2A, the sine wave has been chopped a small amount, dimming the power output about 10%. In FIG. 2B, the sine wave has been chopped a moderate amount which dims power output a moderate amount around 50%. In FIG. 2C, the sine wave has been chopped a large amount, dimming the power output a large amount around 85%.

It is noted that various dimmers 112, now known or later developed may be used with the LED driver 104 and variable output module. This is advantageous in that it allows the variable output module to be used with phase and other dimmers 112 commonly found in existing buildings. In addition, it is contemplated that the variable output module may be used with any dimmer or similar device that chops or alters an AC signal as described herein.

As can be seen from FIG. 1, the AC signal from the dimmer 112 may be received by a variable output module at the LED driver 104. As will be described in the following, the variable output module may utilize the timing (rather than power level) of the AC signal to determine the desired level of light and to provide an output which provides this level of light from one or more LED bulbs 108.

Operation of the variable output module will now be described with regard to FIGS. 3A-3C. As stated, in one or more embodiments, the variable output module utilizes the duty cycle (rather than power level) of an AC signal to determine the desired level of light output. This may occur in various ways. In one or more embodiments, the variable output module may detect a pulse width $T_{on}$ of one or more pulses in an AC signal, and the period P of the AC signal. The ratio of the pulse width $T_{on}$ and period P of the AC signal may then be used to determine the desired level of light. It is noted that the ratio between the sum of a plurality of pulse widths and a period of an AC signal may be used as well. For example, the ratio of the sum of two pulse widths to the period of an AC signal may be used to determine the desired level of light where two pulses occur within the period of the AC signal.

In one or more embodiments, the variable output module may have one or more preset values for the period P. For example, the period P may be set to an expected, known, and/or standardized frequency of an AC power source. To illustrate, period P may be set to a standardized frequency such as 50 Hz in Europe or 60 Hz in North America. Modern utilities supply AC power very close to or at the standardized frequencies and thus the period P may be set to a preset value rather than detected/determined by the LED driver in these embodiments. The LED driver 104 may store the preset value or values in a memory device or be hardwired with one or more preset values.

It is contemplated that in embodiments where a plurality of preset values are provided, the variable output module may be configured to select a preset value for the period P based on a detected period for the AC signal. For instance, the variable output module may be configured to determine a period of the AC signal and set the period P to a preset value accordingly. In one embodiment, the variable output module may set the period P to the preset value closest to the detected period of the AC signal. This allows the LED driver 104 to be used with power sources of various frequencies without the need for manual configuration.

It is noted that the period P need only be set to a preset frequency value once. This is because the frequency of an AC signal typically remains constant. Of course, the variable output module may periodically take a measurement of the AC signal to confirm the period P is set to the correct preset, and, if necessary, switch to different preset when appropriate. For example, the variable output module may take a measurement of the AC signal the first time or each time its LED driver 104 is turned on (i.e. AC power is supplied to the LED driver) in some embodiments.

In general, and as will become apparent from the discussion herein, the variable output module utilizes the timing of an AC signal, such as its pulse width $T_{on}$ and period P, to determine the desired level of light output. Once the desired level of light is determined, an output signal may be generated to provide a corresponding level of light from one or more LEDs, LED bulbs, or other LED lighting.

Figure 3A:
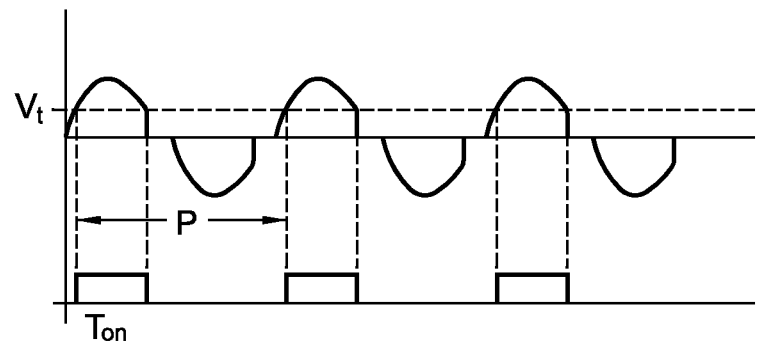
FIG. 3A illustrates a pulse width measurement and period measurement for an exemplary AC signal at a low level of dimming.
Figure 3B:
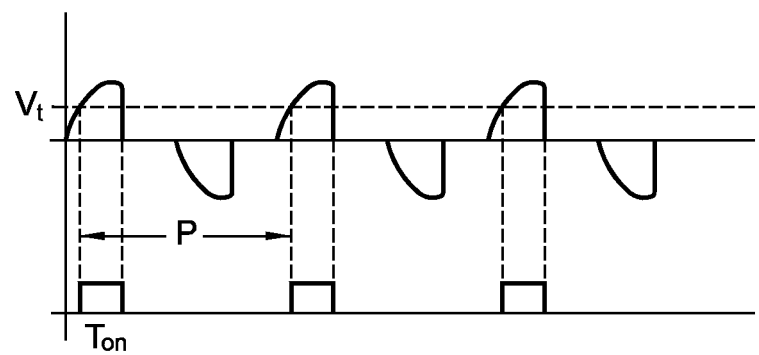
FIG. 3B illustrates a pulse width measurement and period measurement for an exemplary AC signal at a moderate level of dimming.
Figure 3C:
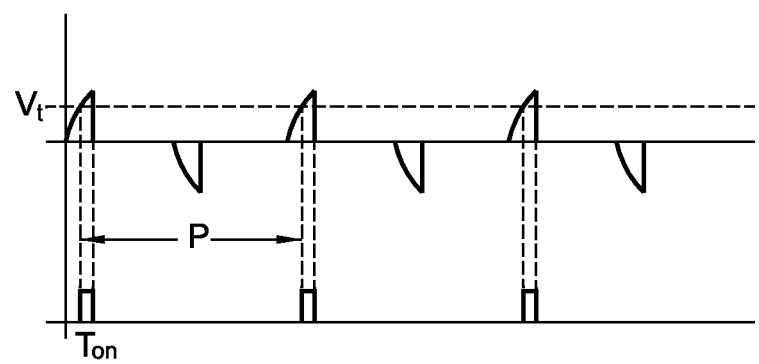
FIG. 3C illustrates a pulse width measurement and period measurement for an exemplary AC signal at a high level of dimming.

FIGS. 3A-3C illustrate exemplary AC signals which the variable output module 104 may receive. Similar to FIGS. 2A-2C, the AC signals in these figures show altered or chopped AC signals which correspond to various levels of dimming. It is noted that these altered AC signals are exemplary and the variable output module 104 may operate with various AC signals having greater or lesser chopped portions. Also, it will be understood that the variable output module may utilize various sinusoidal signals in one or more embodiments.

FIGS. 3A-3C illustrate a threshold $V_t$ and a pulse width $T_{on}$ which may be used in determining the desired amount of dimming indicated of an AC signal. The pulse width $T_{on}$ as used herein will be a measurement of time. The threshold $V_t$ allows a pulse width $T_{on}$ to be determined for one or more pulses of an AC signal. As can be seen, the pulse width $T_{on}$ may be delineated by the points where the voltage of the AC signal cross the threshold $V_t$. In general, a pulse width $T_{on}$ may be delineated by a first point and a second point on the threshold $V_t$. In this manner, the time between the first point and the second point may indicate the pulse width $T_{on}$ of a pulse. The first point may be where the voltage of the AC signal is increasing as it crosses the threshold $V_t$, and the second point may be where the voltage is decreasing as it crosses the threshold $V_t$. To illustrate, as can be seen in FIG. 3A, the pulse width $T_{on}$ is delineated by the points where the AC signal's voltage increase to cross the threshold $V_t$ and decrease to cross the threshold $V_t$. Of course, the first point may be where the voltage of the AC signal decreases across the threshold $V_t$ while the second point may be where the voltage increases across the threshold $V_t$. It is noted that typically, but not always, the first and second point will occur within a phase angle of 0 to 180 degrees of the AC signal.

Similarly, the period P of the AC signal may be determined by one or more points on the threshold $V_t$ where the voltage of the AC signal increases to cross the threshold $V_t$ or decreases to cross the threshold $V_t$. For example, two (or more) consecutive points on the threshold $V_t$ where the AC signal's voltage increases to cross $V_t$ may be used to determine the period of the AC signal. Likewise, two consecutive points on the threshold $V_t$ where the AC signal's voltage decreases as it crosses $V_t$ may be used to determine the period of the AC signal. As can be seen from FIG. 3A, the period P of the AC signal may be determined by two consecutive points on $V_t$ where the voltage is increasing as it crosses $V_t$.

It is noted that various methods of determining the period of an AC signal may be used. It is contemplated that these methods, now known or later developed, may be used by the variable output module to determine the period of an AC signal.

The threshold $V_t$ may be set to various voltages. In one embodiment, $V_t$ may be a positive or negative voltage. It is contemplated that in general, the threshold $V_t$ will be set such that the voltage of an AC signal will cross the threshold $V_t$ at an interval which allows a pulse width $T_{on}$ and period P of the AC signal to be accurately measured as discussed herein.

As shown in FIGS. 3B and 3C, as increasing portions of the AC signal are chopped, the pulse width $T_{on}$ is reduced while the period P of the AC signal remains the same. This allows a comparison or ratio between pulse width $T_{on}$ and period P to be used to determine the desired amount of dimming. To illustrate, in FIG. 3A, it can be seen that a small amount of dimming is desired as shown by the chopping of about 10% of the AC signal. Accordingly, pulse width $T_{on}$ is relatively large when compared to period P. In FIGS. 3B and 3C, pulse width $T_{on}$ decreases relative to period P as increasing amounts of the AC signal are chopped. In FIG. 3B, pulse width $T_{on}$ represents a pulse width of an AC signal that has been dimmed about 50%, while in FIG. 3C, $T_{on}$ represents a pulse width for an AC signal dimmed about 85%.

As stated, the amount of dimming desired may be determined by the ratio of a pulse width $T_{on}$ to period P. For example, the formula $T_{on}/F$ may be used in one or more embodiments to determine the percentage of dimming desired. This may be multiplied by a factor of two to reflect the fact that there may be two pulses within the period of the AC signal. For example, the pulse width $T_{on}$ in FIGS. 3A-3C is measured using only the positive pulses of the AC signal. It is noted that various other factors may be used to compensate for other aspects of the AC signal as well. For example, in one embodiment, an offset may be used to compensate for the voltage at which the threshold $V_t$ is set.

Applying the ratio of pulse width $T_{on}$ to period P in FIG. 3A, it can be seen that the alteration(s) to an AC signal's duty cycle by a dimmer can be detected and the corresponding desired level of light output determined. In the example provided by FIG. 3A, the formula $$\left(\frac{2 \cdot T_{on}}{P}\right)$$

may be used to determine the desired level of light output as a percentage. Assuming example values of 45 for $T_{on}$ and 100 for P (as measures of time), the desired level of light output would be determined at 90%.

It is noted that the amount of light output may be determined on a nonlinear curve based on pulse width $T_{on}$ and/or period P in one or more embodiments. For example, the amount of light output may be a square, cube, or other nonlinear function. This is advantageous in that it allows the LED driver 104 and variable output module to compensate for the way light levels are perceived by a viewer. In general, changes in brightness are perceived nonlinearly by human observers. For example, a change in light output of a bright light is not as noticeable as a change in light output a dim light. Thus, outputting levels of light along a curve can be used to produce a smoother transition from maximum output to minimum output. For instance, at higher output levels, light may be dimmed a larger amount because changes in brightness at high output levels are not as easily perceived.

In one exemplary embodiment, the amount of light output may be determined by the nonlinear function $$\left(\frac{(T_{on} - V_o) \cdot A}{P}\right)^2,$$

where $V_o$ and A may be values used to offset characteristics of the AC signal or LED driver 104 so that the desired level of light may be accurately provided. Of course, A may be set to 1 and $V_o$ set to 0 if such offsetting is not desired. As can be seen, the light output is along a curve according to this square function which compensates for nonlinearities in the perception of light levels.

Once the desired amount of dimming has been determined and output may be provided to power one or more LEDs in a manner that provides the desired level of light output. Various methods, now known or later developed, may be used to provide an electrical output which controls the level of light provided by an LED. For example, known methods such as pulse width modulation, or altering current or voltage provided to an LED may be used.

Various embodiments of variable output modules which allow full range LED dimming utilizing the timing of an AC signal will now be described with regard to FIGS. 4A-4C. It will be understood that other configurations of the variable output module which accept and measure the timing characteristics of an AC signal, as discussed above, to determine the amount of dimming a user desires may be constructed as well. In addition, it is noted that, though described with particular sets of components, components having the same of similar function may be used in one or more embodiments to determine the amount of desired dimming by the timing of a dimmed AC signal. It will be understood that portions of the various embodiments herein may be utilized in one or more combinations to perform the functions of a variable output module as described herein.

Figure 4A:
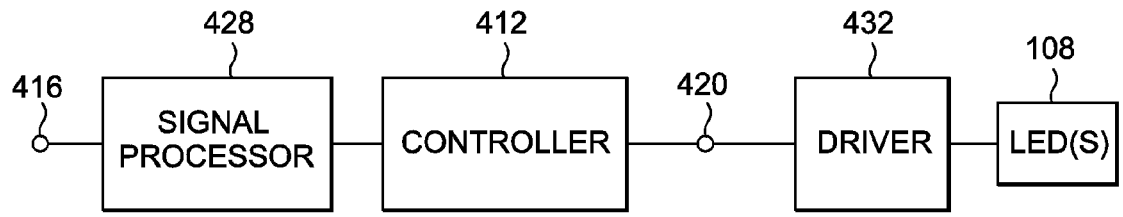
FIG. 4A is a block diagram illustrating elements of an exemplary variable output module.

FIG. 4A illustrates a block diagram of an exemplary variable output module attached to a driver 432 and one or more LEDs 108. In this embodiment, the variable output module comprises a signal processor 428 and a controller 412. The signal processor 428 receives an AC signal from an input 416 while the controller 412 provides an output signal to one or more LEDs 108 via an output 420. In one or more embodiments, the input 416, output 420, or both may be an electrical conduit, coupling, or other electrical connection or connector.

In general, the signal processor 428 processes an AC signal to provide a signal usable by the controller 412 to determine the desired level of light output. In one or more embodiments, the signal processor 428 processes the AC signal so that one or more pulse widths and a period of an AC signal may be determined by the controller 412. For example, the signal processor 428 may provide a pulse train where the pulses represent one or more pulse widths of an AC signal, and the timing of the pulses represents a period of the AC signal. As will be described below the signal processor 428 may have various components and be constructed in various ways.

The controller 412 may then utilize this signal to determine the desired level of light output based on one or pulse widths and a period of the AC signal. For example, the controller 412 may utilize a ratio of one or more pulse widths to the period of the AC signal to determine the desired level of light output, such as described above.

The controller 412 may be constructed in various ways. In one or more embodiments, the controller 412 may comprise a circuit, microprocessor, ASIC, FPGA, control logic, or the like. In some embodiments, the controller 412 may execute instructions to calculate or otherwise determine the desired level of light based on pulse widths and periods of an AC signal. The instructions may be hard wired into the controller, such as through control logic, or may be stored in a memory device for retrieval and execution by the controller.

As discussed above, one or more factors to the calculation of desired level of light output in some embodiments. The controller 412 may be configured to perform this function. For example, where two pulses occur within the period of an AC signal, the controller 412 may apply a multiplication factor of two, such as described above. In this manner, the controller 412 compensates for the number of pulses per period in the AC signal. Of course, as stated, various other factors as well as offsets may be used or included. In addition, the calculation of desired level of light output may occur according to various formulas and, as stated above, may be nonlinear to compensate for nonlinearities in perception of light levels by the eye. Typically, but not always, the desired level of light output will be determined or calculated as a percentage (e.g. 0% to 100%) light output. Once the desired level of light output is determined, the controller 412 may generate an output signal indicating the desired level of light output.

The controller's output signal may be communicated or provided via an output 420 to one or more external components or devices. For example, it is contemplated that the output signal may be provided to one or more LEDs to provide the desired level of light. In the embodiment of FIG. 4A, the output signal is provided to another component. As can be seen, the output signal is provided to a driver 432 in the embodiment of FIG. 4A.

In general the driver 432 processes the controller's 412 output signal so that the output signal may be used to provide the desired level of light from one or more LEDs 108. For example, in one embodiment, the driver 432 may amplify the output signal to power one or more LEDs at the desired light level. The driver 432 may also convert the output signal into a pulse width modulation signal to provide the desired level of light from one or more LEDs. Alternatively, or in addition, the driver 432 may modify the current or voltage of the output signal to achieve the desired level of light from one or more LEDs. It is contemplated that the driver 432 may utilize various methods, now known or later developed, to power one or more LEDs in a manner which produces the desired level of light as determined by the controller 412.

It is noted that a driver 432 may not be provided in all embodiments. For example, the controller 412 or other component of the variable output module may perform the function of a driver 432. In addition, in some situations, the controller's 412 output signal may be used to power one or more LEDs in a manner which produces the desired level of light without further processing by a driver 432 or other component.

It is also noted that the controller 412 may determine the desired level of light without a signal processor 428 in some embodiments. For example, the controller 412 itself may accept an AC signal and determine one or more pulse widths and period of the AC signal without the AC signal first being processed by the signal processor 428. It is further noted that in some embodiments, the signal processor 428 may be internal to the controller 412. In these embodiments, a separate signal processor 412 may not be required.

Figure 4B:
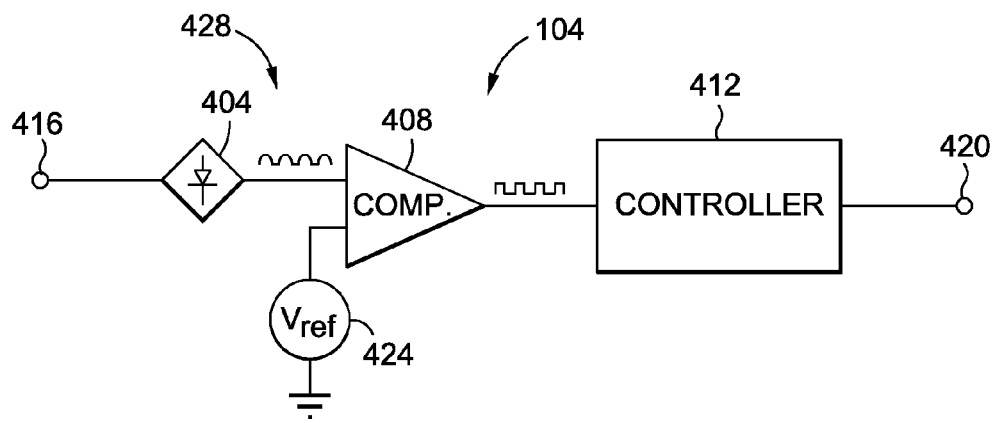
FIG. 4B is a block diagram illustrating elements of an exemplary variable output module.
Figure 4C:
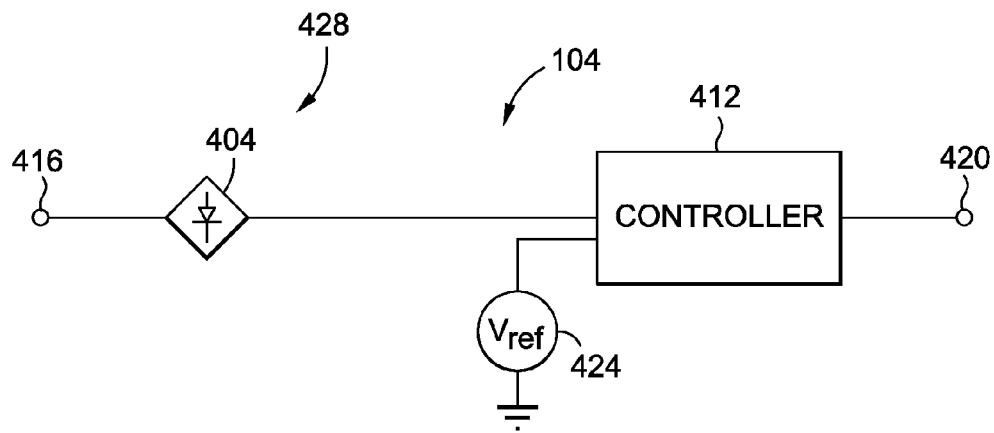
FIG. 4C is a block diagram illustrating elements of an exemplary variable output module.

FIG. 4B illustrates a block diagram of an exemplary variable output module comprising a rectifier 404, comparator 408 and controller 412. In this embodiment, the signal processor 428 comprises a rectifier 404 and comparator 408. It will be understood that the signal processor 428 may perform its AC signal processing function with different components however.

The variable output module may also comprise an input 416 to accept the AC signal, and an output 420 to provide an output signal such as described above. Though not shown, a driver may be connected to the output 420 to process the output signal, if necessary or desired. As shown, a voltage reference 424 may be provided for comparison of various signals as will be described below.

Figure 5A:
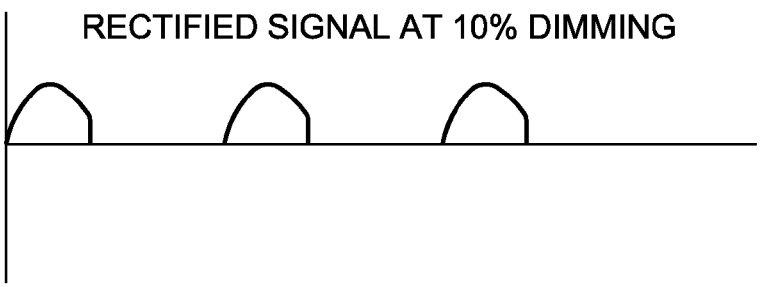
FIG. 5A illustrates a pulse train of an exemplary AC signal at a low level of dimming.
Figure 5B:
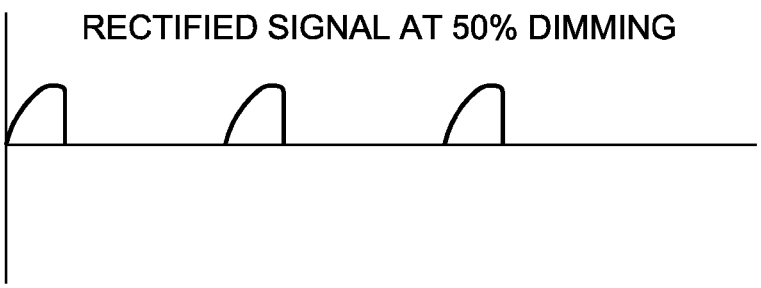
FIG. 5B illustrates a pulse train of an exemplary AC signal at a moderate level of dimming.
Figure 5C:
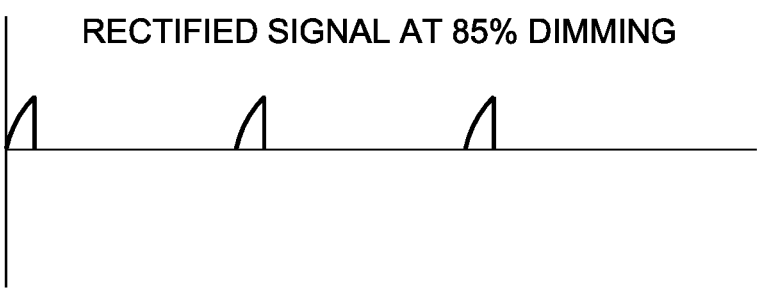
FIG. 5C illustrates a pulse train of an exemplary AC signal at a high level of dimming.

In this embodiment, an AC signal may be received at the input 416. The signal may be rectified by a rectifier 404 to convert the AC signal into a pulse train. Exemplary pulse trains are illustrated in FIGS. 5A-5C and will be described further below. In some embodiments, a full wave rectifier 404 may be used so that the positive and negative portion of an AC signal are converted into a pulse train. Of course, a half wave rectifier 404 may be used as well. As stated above, an AC signal from a dimmer will typically comprise a sine wave chopped at the same location for a particular level of dimming. Thus, the variable output module need not measure every pulse to determine the desired level of dimming. The measurement of one or some pulses may be sufficient to determine the desired level of dimming. For these reasons, the variable output module may utilize a full wave rectifier 404 or a half wave rectifier. The selection of full wave or half wave rectifiers 404 may be for various reasons including cost, efficiency, or other characteristics of the rectifiers.

As indicated above, FIGS. 5A-5C illustrate the exemplary AC signals of FIGS. 2A-2C after rectification by a half wave rectifier. It can be seen that the positive portion of the AC signals of FIGS. 2A-2C have been converted by rectification into a corresponding pulse train in FIGS. 5A-5C. It can also be seen that the pulses generally have the same size and shape as the original AC signal except that the rectification process has given the pulse train a uniform polarity. As is known, half wave rectification results in a pulse train only including the positive or negation portion of the original AC signal. The pulse train would include the positive and negative portion of the original AC signal if full wave rectification were used. It will be understood that the variable output module may utilize positive or negative pulse trains in operation.

Referring back to FIG. 4B, the rectified signal may then be received by a comparator 408. In general, the comparator 408 compares the pulse train of the rectified AC signal with a voltage threshold provided by a voltage reference 424. The voltage threshold provided will typically be a substantially constant voltage which the comparator 408 may compare to voltages of the pulses or signals it receives from the rectifier 404. The voltage threshold may also be a function of the AC input signal in one or more embodiments. Where the voltage of a pulse is above the voltage threshold, the comparator 408 may output a first signal. When the voltage of the pulse is below the voltage threshold, the comparator 408 may output a second signal, different from the first signal. In one or more embodiments, the second signal may be 0V or a low voltage and the first voltage may be a higher voltage, or vice versa. Of course, the comparator may alternatively output the second signal for voltages higher than the voltage threshold, and output the first signal for voltages lower than the voltage threshold.

The operation and output of a comparator 408 can be seen in FIGS. 3A-3C which have been described above. As shown, an exemplary voltage threshold $V_t$ may be used to compare the voltage of one or more pulses. The threshold $V_t$ will typically be the voltage provided by the voltage reference 424. It is contemplated that an offset may be utilized to adjust the voltage provided by the voltage reference 424 if desired. For example, the threshold $V_t$ may be raised or lowered relative to the voltage of the voltage reference 424 by a positive or negative offset.

As can be seen with reference to FIGS. 3A-3C, the comparator 408 generates a first output when the voltage of a pulse crosses above voltage threshold $V_t$. A second output is generated when the voltage of a pulse crosses below $V_t$. In this embodiment, the first output is a fixed voltage representing the pulse width $T_{on}$. The second output may be zero volts or other lower voltage. As can be seen, the output from the comparator results in a square wave having one or more square pulses, the edges of which correspond to the pulse width $T_{on}$ of the pulses received from the rectifier. Thus, it can be seen that pulse width $T_{on}$ of these pulses may be determined by the time between the edges of the one or more square pulses.

It is noted that the first output and second output may be various signals including the fixed voltage output described above. In fact, as long as the first output and second output are distinguishable, a rectifier pulse (and thus the desired amount of dimming) may be measured by a variable output module or component thereof as described herein.

As can be seen from FIG. 4B, the controller 412 may receive the output of the comparator 408. It is noted that some controllers 412 may internally include a comparator and that in these embodiments a separate comparator may not be provided. The controller 412 may determine the desired amount of dimming by determining a pulse width $T_{on}$ and period P from the comparator's 408 output, and provide an output signal which may then be used to produce the desired level of light from one or more LEDs directly or through one or more components, such as a driver as described above.

In one or more embodiments and as described above, pulse widths $T_{on}$ may be represented by the square pulses of a comparator's square wave output. Thus, in these embodiments, the controller 412 may utilize the duration of a square pulse in the square wave output as a pulse width $T_{on}$. Stated differently, the time between the leading and trailing edges of a square pulse may be used as a pulse width $T_{on}$ measurement.

Period P may generally be determined by the distance between two or more square pulses. For example, the time between the trailing or left edges of the square pulses in FIG. 3A indicate the period P of the AC signal. It will be understood that other corresponding portions of (at least) two square pulses may be used to determine the period P as well. For example, the time between the leading or right edge of two square pulses may be used to determine period P.

Once pulse width $T_{on}$ and period P of an AC signal have been determined, the controller 412 may compare one or more pulse widths $T_{on}$ to the period P of the AC signal to determine the desired amount of light output. The ratio of a pulse width $T_{on}$ to the period P may then be used to determine the desired amount of light output. As stated above, period P may be a preset value in one or more embodiments. In these embodiments a preset period P may be used to determine the desired amount of light output.

Once the desired level of light output has been determined, the controller 412 may provide an output signal via the output 420. The output signal may be processed, such as by the controller 412 itself or by a driver, to provide various levels of light from an LED. For example, as stated, known methods such as pulse width modulation or current change may be used to control the level of light from an LED. It is contemplated that a change in voltage may also or alternatively be used to control the level of light as well.

In some embodiments, the variable output module may not include a comparator. FIG. 4C illustrates such an embodiment where the signal processor 428 does not utilize a comparator. The controller 412 may still determine pulse width and period of an AC signal in these embodiments in various ways. In one embodiment an AD (analog to digital) converter within the controller 412 may be used to determine when the voltage of an AC signal is above or below a voltage threshold. In addition or alternatively, the controller 412 may be connected to a voltage reference 424 or utilize an internal voltage reference. The controller 412 may then compare voltages of the pulses from the rectifier 404 to a voltage threshold $V_t$ provided by the voltage reference 424. This allows the controller 412 to determine one or more pulse widths $T_{on}$ delineated by one or more points where voltages of the pulses cross the voltage threshold $V_t$, such as described above with regard to FIGS. 3A-3C.

As can be seen from FIGS. 3A-3C, these points also delineate one or more pulses in the AC signal. The time between corresponding portions of at least two of the pulses may be used to determine the period P of the AC signal. For example, the period P of an AC signal may be determined by the time between the leading or trailing edges of (at least) two pulses. A correct preset value for period P (e.g. 50 Hz or 60 Hz) may also be determined in this manner. Alternatively, the period P may be set to a preset value, such as 50 Hz or 60 Hz for example, which removes the need to determine the period P in one or more embodiments. The ratio of the pulse width $T_{on}$ to this period P may then be used to determine the desired level of light output.

It is noted that in some embodiments, the controller 412 may also perform the function of a rectifier 404 or include a rectifier. In these embodiments, a separate rectifier may not be provided. In addition, it is contemplated that a rectifier 404 may not be necessary in all embodiments because the controller 412 may be configured to ignore portions of an incoming AC signal. For example, the controller 412 may ignore portions of an AC signal below a threshold. In one embodiment, portions of an AC signal below 0V may be ignored. This causes the controller 412 to only operate on the positive pulse train consisting of the portions of the AC signal above 0V. This is similar, if not identical, to the pulse train that would have been provided by a half wave rectifier. Thus, it can be seen that a rectifier 404 may not be required in all embodiments.

From the above, it will be understood that determining the desired amount of dimming through the timing of an AC signal provides an accurate determination of the desired amount of dimming regardless of the power level, voltage, or current of an AC signal. This is generally because the ratio of the pulse widths in a dimmed AC signal to the period of the AC signal provides an independent way of measuring the amount of dimming and consequently the desired amount of light output. In this manner, the desired amount of dimming can be accurately determined even when power levels in an AC signal fluctuate or change. Such fluctuations or changes to power level can be common and may be caused by changes to power output by a utility company or by turning on or off electrical devices. Because the variable output module does not rely on power level to determine the desired amount of dimming, the variable output module can provide full range dimming where traditional drivers cannot, as discussed above.

Further, it can be seen that the LED driver may also compensate for changes in the period of an AC signal. In one or more embodiments, a change in the period of an AC signal may be detected by an increase or decrease in the distance between pulses. Thus, even if the period changes the determination of the desired amount of light output remains accurate. In addition, it is noted that the ratio between pulses of a dimmed AC signal to the period of the AC signal may remain substantially constant as the period changes. For this reason, the determination of desired light output by the variable output module remains accurate.

The ability of the variable output module to use the timing of an AC signal to determine the desired level of light output also reduces or eliminates the need to calibrate the variable output module for various AC standards. Of course, the variable output module must be configured to accept the voltages or currents it is provided, but it need not be calibrated or set for specific voltages or currents or specific voltage or current ranges. This is because timing and not power level of an AC signal is used to determine desired light output. In addition, the variable output module need not be configured for AC signals of particular frequencies or particular ranges of frequencies. As discussed above, the period of an incoming AC signal may be detected by the variable output module and used to provide accurate full range dimming of an LED.

Figure 6A:
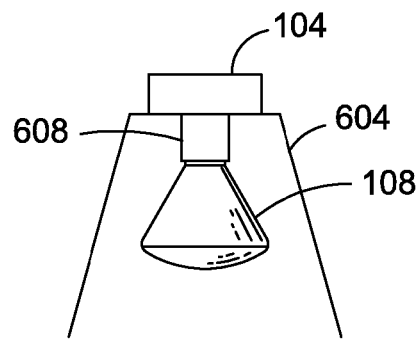
FIG. 6A is a cross section view of an exemplary lighting can having a variable output module.
Figure 6B:
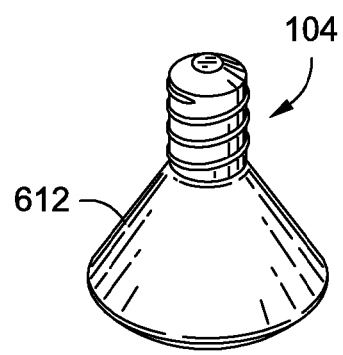
FIG. 6B is a perspective view of an exemplary LED bulb having a variable output module.

The variable output module may be used in a variety of applications. In one or more embodiments, the variable output module may be relatively small in size. This allows the variable output module to be installed in various locations and devices large and small. FIGS. 6A and 6B illustrate example devices and locations where an LED driver 104 having a variable output module may be installed. FIG. 6A is a cross section view where an LED driver 104 with an integrated variable output module is mounted to a standard overhead lighting can 604. An AC signal from a phase dimmer or the like may be provided via standard wiring to the LED driver 104. The LED driver 104 may have its outputs connected to a socket 608 which accepts an LED bulb 108. In this manner, full range dimming of the LED bulb 108 can be achieved through a standard phase dimmer.

It is noted that because the wiring from the phase dimmer to the lighting can 604 is the same as the wiring for incandescent lighting, the variable output module allows easy retrofit of existing lighting systems. For example, an incandescent lighting may be replaced with the lighting can 604 described above having a variable output module attached thereto. In addition, or alternatively, a variable output module may be connected to the socket of an existing lighting can to allow dimming of an LED bulb via the now enhanced socket.

FIG. 6B illustrates a LED driver 104 having the variable output module built in to an LED bulb 612. In this embodiment, the LED driver 104 and variable output module may be located in the base portion of the LED bulb 612. This is highly advantageous in that fully dimmable LED lighting may be installed simply by replacing an incandescent or other bulb with this LED bulb 612. In one or more embodiments, the LED driver's input will accept an AC signal from the LED bulb's screw-type or other connector and provide output to one or more LEDs within the LED bulb 612.

As another example, the variable output module may be built into a standard phase dimmer. In this embodiment, by replacing a standard phase dimmer and installing an LED bulb in the appropriate socket, fully dimmable LED lighting may be achieved. In one or more embodiments, the input of the variable output module may be connected to an output of the phase dimmer and the output of the driver connected to wiring which leads to a socket for holding the LED bulb.

It can thus be seen that the variable output module provides numerous advantages and may be used in many different ways. By providing full range dimming for LEDs, the variable output module allows LED lighting to be used in applications where high quality dimming is required or desired. This allows users to take advantage of the efficiency and reliability benefits of LED lighting while allowing accurate and full range dimming which is not provided by traditional LED drivers.

It is contemplated that, in addition to lighting, other electrical devices may be controlled and/or powered using the periodic signal characteristics (i.e., timing) of an input signal (such as described above with regard to FIGS. 2A-2C and 3A-3C). For example, in one or more embodiments, the variable output modules disclosed herein may be configured to provide variable power output to various electrical devices, such as motors, stepper motors, servos, and the like. This permits these electrical devices to be accurately "dimmed", such as to control their speed or other operation.

For example, in one or more embodiments, a variable output module may be configured to determine a desired power output level based on the periodic signal characteristics of an input signal. As described above, the input signal may be an AC or other signal having a period. The variable output module may compare the signal's pulse width to its period to accurately determine the desired power output level. By determining power output levels in this manner, the variable output module can provide an accurate measure of desired power output regardless of the type of input signal. For example, as disclosed above, the variable output module herein can provide accurate adjustment of power levels (i.e., dimming) for AC power standards in virtually any country without recalibration.

Figure 7A:
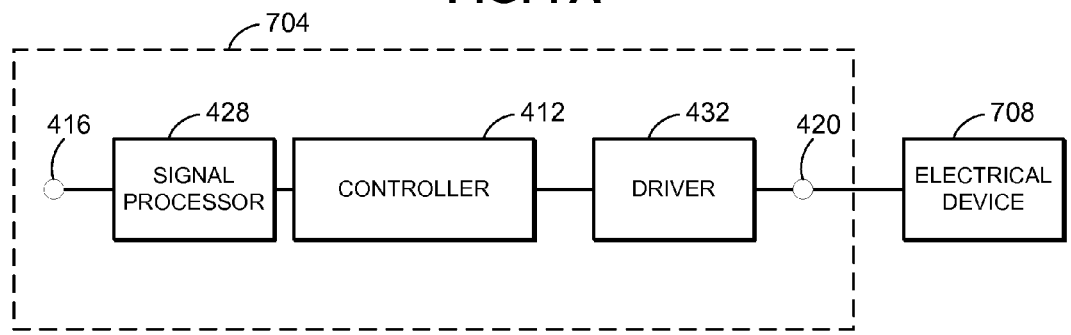
FIG. 7A is a block diagram illustrating an exemplary variable output module.

The variable output module will now be described with regard to FIGS. 7A-7B. As can be seen, the variable output module 704 may comprise a controller 412 and driver 432 in some embodiments. Referring to the embodiment of FIG. 7A, it can be seen that the variable output module 704 may receive an input signal having a period, such as from a dimmer, dimming circuit, or the like. Some exemplary input signals include an AC input, a chopped signal, or other modulated electrical signal having a periodicity. The input signal may be received at an input 416. It will be understood that the input 416 may be coupled to a damping circuit to reduce signal oscillations or ringing.

As discussed above, the controller 412 may determine a desired level of power output based on the characteristics of the input signal, such as the period and pulse width of the input signal. It is noted that a separate signal processor 428 may be part of the variable output module 704 in some embodiments to process the input signal before it is received by the controller 412. For example, the signal processor 428 may rectify the input signal, such as described above. It is contemplated that a signal processor 428 may be integrated into the controller 412 in some embodiments.

The controller 412 may then generate and transmit an output signal to the driver 432, which in turn, generates the power output at the desired power level according to the output signal. The power output may be various types of output, such as direct current output or a pulse width modulation signal, according to the needs of the electrical device 708 that is to be powered. As can be seen, the electrical device 708 to be powered may be connected to the variable output module 704 via an output 420 of the variable output module. As illustrated in the example of FIG. 7A, the electrical device 708 may be a device that consumes or utilizes electrical power as provided by the driver 432.

In some embodiments the signals generated by the controller 412 may be transmitted from the variable output module 704 directly to an electrical device 708. As shown in FIG. 7B for example the variable output module 704 comprises the optional signal processor 428 described above, and a controller 412 that is directly coupled to an electrical device 708.

The electrical device 708 may act on the signal from the variable output module 704 according to its specifications. For example, in one embodiment, the electrical device 708 may be a driver configured to generate varying power output based on a power level indicated in the output signals from the variable output module 704. As another example, the electrical device 708 may be a motor controller, such as a variable frequency drive that can alter the speed of a motor based on the signals from the variable output module 704. In yet another example, the electrical device 708 may be a data collection device, which stores the signals received from the variable output module 704.

It is contemplated that the variable output module 704 may be embedded within various devices in some embodiments. To illustrate, the variable output module 704 is shown embedded within a power supply 716 in FIG. 7C. The power supply 716 may provide or share an input signal to the variable output module 704. For example, as shown, the input signal could be received directly from an input terminal 728 of the power supply 716. The input terminal 728 may be connected to a power source, such as a wall outlet, battery, or the like.

The output signal provided by the variable output module 704 may then be used to control operation of the power supply's transformer 724 and/or regulator 736 to generate a desired level of power output. As shown in FIG. 7C for example, the output 420 of the variable output module 704 is in communication with the transformer 724 to allow adjustment of the transformer's operation based on signals from the variable output module. A damping circuit 720 and regulator 736 of the power supply 716 may be provided to help ensure the desired level of power is provided within a predefined margin of error. The power supply 716 may then output power to power an electrical device via its output terminal 732.

The variable output module 704 may be embedded or integrated into various other devices. For example, the variable output module 704 may be part of an LED driver, motor controller, motor, or LED or other light bulb as described above. In one or more embodiments the variable output module 704 may be embedded into an integrated circuit, microprocessor, or the like. For example, the variable output module's controller 412 may be implemented in circuitry within an integrated circuit in one or more embodiments. In such embodiments, the variable output module 704 may provide its output signal to a circuit or other component within the integrated circuit. Likewise, input signals may be received from a circuit or other component of the integrated circuit.

It is also contemplated that the variable output module 104 may be configured as a standalone device in one or more embodiments. For example, the variable output module 704 of FIG. 7A may be manufactured as a standalone device configured to provide amplified power to one or more remote electrical devices 708 since it includes a driver 432. For example, the variable output module 704 may be a standalone device configured to power LED lighting, a stepper motor, or the like.

Figure 7B:
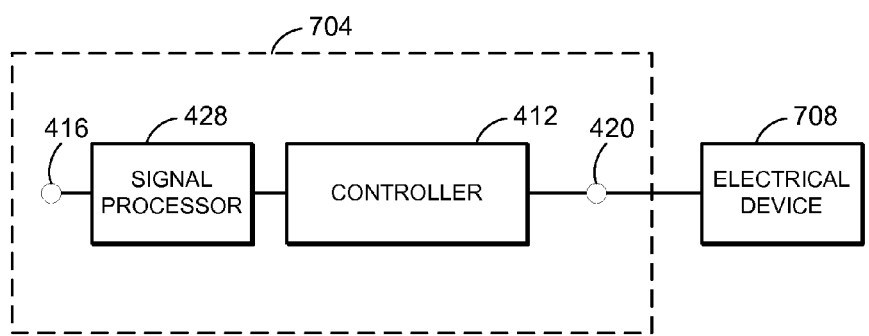
FIG. 7B is a block diagram illustrating an exemplary variable output module.
Figure 7C:
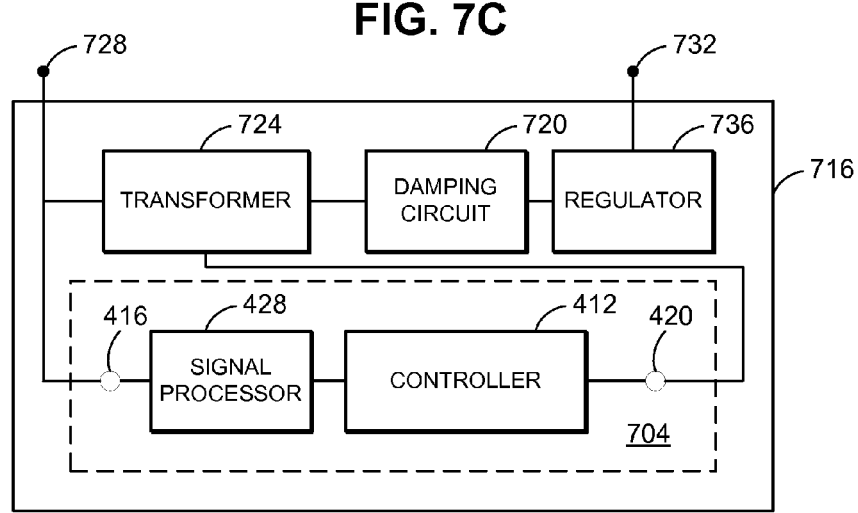
FIG. 7C is a block diagram illustrating an exemplary power supply having an embedded variable output module.

Likewise, the variable output module 704 of FIG. 7B (which does not include a driver 432) may be a standalone device configured to provide the controller's output signal to an electrical device 708. For example, a standalone variable output module 704 may transmit its output signal to an external driver or power supply which can, in turn, power another electrical device. It is noted that in standalone embodiments the variable output module 704 may have its own enclosure.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A driver module for controlling electrical output comprising:
one or more input terminals configured to receive an electrical signal from an external device;
a controller in electrical communication with the input, the controller configured to:
receive the electrical signal;
determine a pulse width of the electrical signal;
determine the period of the electrical signal; and
generate a varying level of electrical output, wherein the electrical output is increased or decreased based on a ratio of the pulse width of the electrical signal to the period of the electrical signal;
one or more output terminals configured to transmit the electrical output, wherein the electrical output represents a desired level of electrical power at the external device.

2. The driver module of claim 1, wherein the one or more input terminals are configured to receive a modulated electrical signal.

3. The driver module of claim 2, wherein the electrical output is a direct current output.

4. The driver module of claim 1, wherein the external device is a dimmer configured to receive and alter a duty cycle of the electrical signal, wherein the controller receives the electrical signal with the altered duty cycle from the dimmer.

5. The driver module of claim 4, wherein the dimmer comprises at least one control configured to receive user input indicative of a power level a user desires.

6. The variable output module of claim 1 further comprising a driver configured to generate a power output based on the electrical output.

7. The driver module of claim 1 further comprising a converter configured to convert the electrical output to a pulse width modulation signal, wherein the output terminals are configured to transmit the pulse width modulation signal from the driver module.

8. The driver module of claim 1, wherein the electrical output is an output signal indicating the ratio of the pulse width to the period of the electrical signal.

9. A driver module providing variable direct current output comprising:
a controller having a first input and a first output, the controller configured to:
receive the electrical signal at the first input;
determine a pulse width of the electrical signal;
determine the period of the electrical signal;
generate a control signal, wherein the control signal varies according to a ratio of the pulse width of the electrical signal to the period of the electrical signal; and
transmit the control signal from the first output; and
a driver having a second input and a second output, the driver configured to:
receive the control signal from the controller at the second input;
generate a direct current power output based on the control signal; and
transmit the direct current power output to an external device from the second output.

10. The driver module of claim 9, wherein the first input is configured to receive a modulated electrical signal.

11. The driver module of claim 9, wherein the first input is connected to a dimmer.

12. The driver module of claim 9, wherein the driver is further configured to alter the power level by changing the voltage of the direct current power output as the control signal changes.

13. The driver module of claim 9, wherein the driver is further configured to alter the power level by changing the current of the direct current power output as the control signal changes.

14. The driver module of claim 9 further comprising an enclosure configured to house the controller and the driver in a single self-contained assembly.

15. A method of determining a power level from an electrical signal with a driver module comprising:

receiving an electrical signal having a periodicity at an input terminal of the driver module;

determining a pulse width of the electrical signal with a controller of the driver module;

determining a period of the electrical signal with the controller;

generating a first signal if a ratio of the pulse width to the period is above a predefined threshold;

generating a second signal if the ratio of the pulse width to the period is below the predefined threshold; and outputting the first or the second signal through an output terminal.

16. The method of claim 15, wherein the first and second signal are both direct current signals.

17. The method of claim 15 further comprising connecting the input terminal to an electrical signal source wherein the electrical signal is received from the electrical signal source.

18. The method of claim 15 further comprising connecting the input terminal to a dimmer wherein the electrical signal is received from the dimmer.

19. The method of claim 15 further comprising connecting the output terminal to a driver, the driver configured to generate a power output of a first level if the first signal is received, and a power output of a second level if the second signal is received, wherein the first and second levels are distinct.

20. The method of claim 15, wherein the pulse width and period are determined by the controller based on a time at which the electrical signal crosses a predefined voltage threshold.

* * * * *